United States Patent [19]

Daimer et al.

[11] 4,356,278

[45] Oct. 26, 1982

[54] HEAT-HARDENABLE RESINS SUITABLE FOR CATHODIC DEPOSITION

[75] Inventors: Wolfgang Daimer; Heiner Verdino, both of Graz, Austria

[73] Assignee: Vianova Kunstharz, A.G., Werndorf, Austria

[21] Appl. No.: 953,749

[22] Filed: Oct. 23, 1978

[30] Foreign Application Priority Data

Nov. 3, 1977 [AT] Austria ................................. 7830/77

[51] Int. Cl.$^3$ ............................................. C08L 63/08
[52] U.S. Cl. .................................... 523/414; 523/420; 525/380; 525/382; 204/181 C
[58] Field of Search .................... 260/836, 879, 880 R, 260/29.7 AT, 29.7 UA, 29.7 W, 29.7 UP

[56] References Cited

U.S. PATENT DOCUMENTS 3,455,965  7/1969  Schleimer ........................ 260/880 R
3,957,903  5/1976  Doi ..................................... 260/836

*Primary Examiner*—Paul R. Michl
*Attorney, Agent, or Firm*—A. W. Breiner

[57] ABSTRACT

Heat-hardenable synthetic resins which are water soluble upon partial or total neutralization comprising the reaction products of epoxy groups containing unsaturated diene polymers and amine compounds, graft polymerized with alpha, beta-ethylenically unsaturated monomers which are free from epoxy reactive groups, the homopolymers of the monomers having a glass transition temperature of over 320° K. A process of preparing the heat-hardenable resins is also described. The synthetic resins can be employed as binders for cathodically depositable aqueous coating compositions to provide coatings which will cure at relatively low temperatures and relatively short curing times to provide smooth and hard films having good resistance to water, chemicals, and corrosion; and which adhere well to the coated surface.

10 Claims, No Drawings

HEAT-HARDENABLE RESINS SUITABLE FOR CATHODIC DEPOSITION

The present invention is directed to heat-hardenable synthetic resins. More particularly, the invention is directed to heat-hardenable synthetic resins which, in addition to being suitable for application by conventional methods such as spraying, dipping and brushing, are suitable for deposition from aqueous solutions of the resins at the cathode of an electrodeposition coating system.

A substantial number of resinous binders have been proposed for deposition at the cathode of an electrochemical system, the majority being based on epoxy resins, and specifically on the polyglycidyl ethers of bisphenol A (2,2-bis(4-hydroxylphenyl)propane).

Although epoxidized polymers of dienes have been suggested for cathodic application, no specific, practical examples are known in the prior art. Thus, while it is known that epoxidized polymers of dienes can be reacted with amine compounds to provide cathodically depositable products, coating compositions based on the epoxidized diene polymers have a number of disadvantages making them substantially useless for industrial scale coatings. As an example, the coatings exhibit poor throwing power; the freshly deposited films have a gel-like structure and, thus, cannot be rinsed without difficulty to remove adherent bath material; owing to their thermoplastic character, the coatings recede from the edges of the coated article with rising temperatures during the stoving process; and the coatings, under the conditions prevailing in industrial coating, do not attain the required smoothness and hardness. In spite of the noted disadvantages, the epoxidized diene polymers exhibit certain advantages over the epoxy resins based on polyglycidyl ethers of bisphenol A. For example, the backbone of the polymer consists of $-CH_2-CH_2-$ linkages resistent to saponification; whereas in the polyglycidyl ethers, the backbone of the polymer is interrupted periodically by ether linkages which are susceptible to splitting, particularly by acidic reactants. Furthermore, polymers of dienes carry a substantial number of unsaturated $-CH=CH-$ double bonds in the polymer backbone or in side chains, which upon crosslinking of the coating produced therefrom can be used for polymerization reactions or other reactions due to the action of airoxygen. A further substantial advantage of the epoxidized diene polymers is that they are liquid to viscous masses at room temperature. Accordingly, the solvents otherwise necessary in binder synthesis, or at least a substantial part of the solvents, can be omitted. This can be desirable from the standpoint of cost and ecology; and, further, in the electrodeposition process there are a number of solvents which are inconvenient in that they may detrimentally affect the electrochemical properties, e.g., the maximum attainable deposition voltage. The suitable (higher molecular) epoxy resins of the bisphenol glycidylether type are solid masses at room temperature and have to be dissolved in suitable solvents prior to synthesis reactions. Furthermore, the choice of solvents is greatly reduced owing to the reactivity of the epoxy group. As a result, in the prior art the ketones are preferably used although their presence in the coating bath, as is known, is particularly harmful to the cathodic electrodeposition.

According to the present invention, it has been found that the disadvantages of cathodically depositable reaction products of epoxidized, unsaturated diene polymers and amine compounds as above stated can be overcome without loss of the above-mentioned advantages, provided the products are modified through graft polymerization with specific monomers. Based on the present invention, coating compositions for cathodic electrodeposition can be formulated using the epoxidized diene polymers which fully meet the requirements of large-scale industrial applications.

The present invention, therefore, is directed to cationic binders for water-dilutable, heat-hardenable coating compositions comprising the reaction products of epoxy group containing unsaturated diene polymers and amine compounds, characterized in that the products are prepared by graft polymerization of alpha,beta-ethylenically unsaturated monomers which are free from epoxy-reactive groups, the homopolymers of these monomers having a glass transition temperature of over 320° K., to reaction products of low molecular unsaturated diene polymers carrying at least one 1,2-epoxy group in the molecule and amine compounds. Optionally, the hydroxy groups of the polymers resultant from the reaction of the epoxy groups with amines can be partially or totally esterified with monocarboxylic acids. The invention is also directed to the process of preparing the cationic binders, and to their use in coating compositions applied by cathodic electrodeposition.

The reaction of the epoxidized unsaturated diene polymers with secondary amines is described in British Pat. No. 1,148,899 for the preparation of pressure-sensitive adhesives. According to the British patent, rubber-like polymers of 1,4-cis-polybutadiene or butadiene-styrene or acrylonitrile-butadiene copolymers serve as the starting material. The additional monomers are part of the copolymer skeleton and are not grafted to the polymer chain by a subsequent graft polymerization. Further, the graft polymerization of alpha,beta-ethylenically unsaturated monomers free from carboxy groups to macromolecules is described, for example, in H. Rauch-Puntigam and Th. Völker "Acrylic And Methacrylic Compounds," pages 192 ff. (Springer, 1967). However, there is no suggestion in the literature of grafting to basic polymers or to use them in water-soluble cathodically depositable binders. Furthermore, it could not be foreseen that the desired properties would only be obtainable by the use of monomers where the glass transition temperature of the homopolymers of the monomers was above 320° K.

Suitable unsaturated diene polymers are in particular the liquid oligomers and polymers of butadiene, pentadiene, isoprene, etc., and/or with the coemployment of subordinate quantities of other monomers or chain end formers. The microstructure of such polymers is not critical in constitution, i.e., in the butadiene polymers 1,4-cis structures may be present besides 1,4-trans and 1,2-vinyl structures. In general a minimum of 30 percent of 1,4-cis configuration is preferred because, on the one hand, the epoxidizing reaction more easily occurs at this structure and, on the other hand, the later oxidative crosslinking reaction of the coating is enhanced through the 1,4-cis configuration. Suitable polymers have molecular weights of below 5000 and iodine numbers of between 300 and 470, and at room temperature are preferably liquid to resinlike viscous masses having a pale color. The unsaturated polymers are transformed by known epoxidizing reactions, for example, with blends of glacial acetic acid and hydrogen peroxide to epoxidized unsaturated diene polymers, whereby preferably a small quantity only of the —CH=CH— double bond is transformed to oxirane rings, the major quantity remaining unchanged. A number of products having varying oxirane-oxygen levels are available on the market. Particularly suited for use according to the present invention are epoxidized diene polymers with an oxygen level of from 1 to 18 percent, with 1 to 12 percent of the oxygen level being oxirane oxygen. The polymers preferably have a viscosity of from 500 to 30,000 mPas at 20° C. and iodine numbers of from 150 to 450. The polymers can optionally contain hydroxy groups.

The epoxidized diene polymers are reacted with amine compounds at elevated temperature in order to obtain a polymer with basic nitrogen atoms. Suitable amine compounds for use according to this invention are aliphatic and cycloaliphatic amines and alkanol amines. Included are the diamines and polyamines, as along as the primary and secondary functional groups reactable with oxirane groups are not substantially more than 2. The di- or polyamine can, without detriment, contain a random number of tertiary amine groups which, under the conditions chosen for the reaction, are inert or substantially inert to oxirane groups. The introduction of these tertiary amine groups enhances the basicity of the polymer molecule at low levels of oxirane groups.

Suitable primary amines or alkanolamines include methylamine, ethylamine, and higher homologues thereof, their isomers, ethylene diamine, propylene diamine, monoethanolamine, monopropanolamine, their homologues and isomers. Suitable secondary amines and alkanolamines are, e.g., dimethylamine, diethylamine, their higher homologues and isomers, morpholine, N-methylbenzylamine, N-methylcyclohexylamine, piperazine, piperidine and pyrrolidine, diethanolamine, dipropanolamine, N-methylethanolamine, their higher homologues and isomers. Suitable di- and polyamines are, e.g., N',N-dimethylaminopropylamine, N',N-diethylaminopropylamine. Suitable polyamines include polyamines where the primary amine functions are masked as ketime groups. An example is the reaction product of one mole of diethylene trimaine and two moles of methylisobutylketone, being formed with the separation of two moles of water. At the end of the binder synthesis the ketimine groups may be split off by hydrolysis with the freeing of the primary amine group.

The reaction between epoxidized diene polymer and amine compound can be carried out at room temperature or, preferably, at a temperature of between 80° and 250° C. The weight ratios are chosen in order that the finished binder, on the total, including the graft polymer and other optional modifying additives, has an amine number of from 30 to 150 mg KOH/g (DIN 53 176). The presence of antioxidizing agents based on substituted phenols or substituted aromatic amines, in a level of up to two percent of the reaction mass, is advantageous in order to prevent undesired side reactions which can lead to a molecular size increase. Suitable compounds include 2,5-di-tertiary butyl-4-methylphenol and N,N'-diphenyl-p-phenylene diamine.

The unsaturated epoxidized diene polymer is graft polymerized to the alpha,beta-unsaturated monomers during or after the reaction with the amine compound, the monomers being free from epoxide reactive groups and the homopolymers thereof having glass transition temperatures of at least 320° K. Monomers meeting the requirements as stated include (meth)acrylnitrile, methylmethacrylate, isopropylmethacrylate, tert.butylmethacrylate, styrene, vinyltoluol, indene, and vinylcarbazol. A survey on glass transition temperatures of various polymers is given in *Official Digest* 34, No. 445, 2, page 133. The monomers are used at a level of from 3 to 30 percent calculated on the sum of epoxidized diene polymer and amine compound. The graft polymerization is carried out in known manner in the presence of free radical polymerization initiators at temperatures of from 80° to 220° C. Normal initiators are azobisisobutyronitrile, dibenzoylperoxide, di-tertiary butylperoxide, dicumylperoxide, and the like. The coemployment of chain transfer agents, for example, mercaptans, can be desirable. In general, a conversion of over 80 percent is desired. The unpolymerized monomers can remain in the reaction mass or they can be removed, e.g., through distillation.

Upon opening of the oxirane rings in the reaction with the amine compound hydroxy groups are formed. These hydroxy groups are available for further reactions, e.g., for esterification reactions. The esterification is preferably effected with monocarboxylic acids, optionally also with subordinate quantities of dicarboxylic acids. Suitable monocarboxylic acids include the drying and non-drying vegetable oil fatty acids, rosin acids, particularly rosin, or aromatic monocarboxylic acids such as benzoic acid or p-tertiary butyl benzoic acid. In a manner similar to that for the hydroxy groups, the excess epoxy groups not used for the reaction with the amine compound can be esterified with the aforementioned monocarboxylic acids.

The finished reaction product can be diluted in solvents convenient for cationic electrodeposition, including alcohols such as ethanol, propanol, isopropanol, and the butanols; the glycolethers such as ethylglycol, isopropyl glycol and butyl glycol, and the like. It is also possible to dilute the finished reaction product with water, without the addition of solvents, upon at least partial neutralization with acids.

Independent from the manner of dilution, the binders can be used in pigmented or unpigmented form. Suitable pigments and extenders are titanium dioxide, carbon black, iron oxides, phthalocyanines, lead silicate, lead oxide, lead chromate, lead silico chromate, and strontium chromate. Normal extenders are quartz powder, aluminum silicate, talcum, barium sulfate, highly dispersed silicic acid, and the like.

The basic nitrogen atoms of the binders of the invention are partially or totally neutralized with organic or inorganic acids. The degree of neutralization depends on the individual binder system. In general, sufficient acid is added to permit dilution with water or dispersion of the coating composition in application form at a pH-value of from about 4 to 9, preferably 5 to 7. The concentration of the binder in water may range from about 3 to 30 percent by weight, and preferably from 5 to 15 percent by weight.

The coating compositions of the binders of the invention may be applied by spraying, dipping, flow coating, and electrodeposition. In an electrodeposition process the coating composition is wired with an electrically conductive anode and an electrically conductive cathode, the surface of the cathode being coated. Suitable substrates are metallic substrates, in particular steel, aluminum, copper, etc., and also metalized plastics or other materials coated with a conductive coating. After deposition, the coating is optionally rinsed with water and stoved at 130° to 220° C., preferably 150° to 190° C. Curing time is from about 5 to 30 minutes, preferably 10 to 25 minutes.

The following examples are illustrative of the invention without limiting the scope thereof. Parts are by weight unless otherwise stated. All examples utilized comparable conditions in reaction vessels equipped with stirrer, thermometer, inert gas duct, addition funnel, and reflux condensor.

EXAMPLE 1

437 g of an epoxidized polybutadiene containing 4.2 percent by weight of epoxy oxygen and having a microstructure of 40 percent 1,4-cis, 13 percent 1,4-trans, and 47 percent 1,2-vinyl configuration; and a viscosity of 4400 mPas at 20° C. are heated to 100° C. together with 0.175 g of 2,6-di-tert.butyl-4-methylphenol. 77 g of vinyltoluol, 1.6 g of di-tertiary butylperoxide, and 65 g of N,N-diethylaminopropyl amine are added and the batch is heated to 200° C. while stirring and under inert gas protection within 2 to 3 hours as reflux permits. After about 6 hours of reaction time the solids content has risen to more than 98 percent. The viscosity of a solution of 7 g of the reaction mass and 3 g of ethylglycol acetate is U, Gardner standard. At 180° C., 120 g of rosin are added and reacted at this temperature for about 1 hour, until an acid value of 2 mg KOH/g is attained. The viscosity of a solution of 5 g of reaction mass and 5 g of ethylglycol acetate is T, Gardner standard. At 100° C., the resin is diluted to 70 percent solids with ethylglycol. The amine number of the resin is 80 mg KOH/g (DIN 53 176).

EXAMPLE 2

437 g of an epoxidized polybutadiene with 4.1 percent epoxy oxygen, a microstructure of 60 percent 1,4-cis and 40 percent 1,4-trans double bonds, and a viscosity of 3700 mPas at 20° C. is heated to 100° C. with 0.44 g of 2,6-di-tertiary butyl-4-methylphenol. 73.5 g of diethanolamine are added and the temperature is raised to 180° C. The temperature is held for about 6 hours, until a sample of the resin is not turbid at room temperature when applied to a glass plate. At 150° C., a blend of 77 g styrene and 0.8 g di-tertiary butyl peroxide is added within 1 hour, and the batch is reheated to 180° C. After 4 hours of reaction time at 180° C., a solids content of 97 percent is attained. A sample of the resin, diluted with butylglycol and neutralized with lactic acid is soluble in water to give a clear solution. The viscosity of a 50 percent resin solution in xylene is J, Gardner standard. The resin is diluted at 120° C. with ethylglycol to a solids content of 70 percent. The amine number of the resin is 63 mg KOH/g (DIN 53 176).

EXAMPLE 3

270 g of an epoxidized polybutadiene with 5.4 percent by weight of epoxy oxygen, with a microstructure of about 60 percent of 1,4-cis and 40 percent of 1,4-trans double bonds, and a viscosity of 7260 mPas (20° C.) are heated to 80° C. together with 0.27 g of 2,6-di-tertiary butyl-4-methylphenol. 67 g diisopropanol amine are added and the temperature is raised to 150° C. At this temperature, within the course of 40 minutes, a blend of 38 g of vinyltoluene, 10 g of methylmethacrylate and 0.7 g of di-tertiary butyl peroxide are added dropwise. As reflux permits, the temperature is raised to 180° C. and held for about 9 hours, until a cold sample of the resin is not turbid on a glass plate. The solids content is 97.2 percent. Diluted with a little butyl glycol and neutralized with lactic acid the reaction product is soluble in water to give a clear solution. The viscosity of a resin solution of 2 parts of resin and 1 part by xylene is W, Gardner standard.

At 150° C., 35.5 g of p-tertiary butyl benzoic acid are added and reacted at 160° C. for about 1 hour, until the acid value is below 4 mg KOH/g. The finished reaction product is diluted at 120° C. with ethylglycol to a solids content of 70 percent. The amine number of the resin is 68 mg KOH/g (DIN 53 176).

EXAMPLE 4

300 g of an epoxidized polybutadiene with 5.4 percent by weight of epoxy oxygen, a microstructure of about 60 percent of 1,4-cis and 40 percent of 1,4-trans double bonds, and a viscosity of 7260 mPas (20° C.) are heated to 150° C. with 0.3 g of 2,6 di-tertiary butyl-4-methylphenol. At this temperature a blend of 53 g of vinyltoluene and 0.5 g of di-tertiary butylperoxide and, separately, 42 g diethanolamine are added at the same time, in the course of 30 minutes. The batch is reheated to 180° C. and the temperature is held for about 10 hours, until the non-volatile content of the reaction mass has reached more than 98 percent. At 120° C., the batch is diluted with 130 g of ethyleneglycolmonoethylether acetate to 75 percent solids. The amine number of the resin is 53 mg KOH/g (DIN 53 176).

COMPARISON EXAMPLE A 437 g of the epoxidized polybutadiene of Example 1 are heated to 100° C. with 0.17 g of 2,6-di-tertiary butyl-4-methylphenol. 65 g of N,N-diethylaminopropylamine are added and the temperature is raised to 180° C. It is held for about 10 hours, until a sample of the resin neutralized with lactic acid is soluble in water to give a clear solution. The solids content of the resin is 99 percent. At 150° C., 120 g of rosin are added and the temperature is held until after about 3 hours the acid value has fallen below 3 mg KOH/g. At 120° C., the batch is diluted to 70 percent solids with ethyleneglycol monoethylether. The amine number of the resin is 72 mg KOH/g (DIN 53 176).

COMPARISON EXAMPLE B 437 g of the epoxidized polybutadiene of Example 2 are heated to 100° C. with 0.44 g of 2,6 di-tertiary butyl-4-methylphenol. 73 g diethanolamine are added and the batch is reheated to 180° C. This temperature is held for about 9 hours, after which time a sample of the batch remains clear when cooled to room temperature. At the end of the reaction, the solids content is 99 percent. At 120° C., the batch is diluted to 70 percent solids with ethyleneglycol monoethylether. The amine number of the resin is 72 mg KOH/g (DIN 53 176).

COMPARISON EXAMPLE C 300 g of the epoxidized polybutadiene used in Examples 3 and 4 are heated to 150° C. with 0.3 g 2,6-di-tertiary butyl-4-methylphenol. At this temperature, 52 g of diethanolamine are added within 30 minutes. The temperature is raised to 180° C. and held for about 3 hours. During this time the batch becomes clear, the solids content is 99 percent, and the viscosity of a solution of 6 parts reaction mass and 4 parts of ethyleneglycol-monoethylether acetate is O, Gardner. At 150° C., 121 g of rosin are added and this temperature is held until the acid value has fallen below 10 mg KOH/g. The resin is highly viscous and is diluted at 140° C. with ethyleneglycol monoethylether acetate to 60 percent solids. The amine value of the resin solids is 57 mg KOH/g (DIN 53 176).

APPLICATION OF THE BINDERS PREPARED ACCORDING TO THE EXAMPLES

The resins of Examples 1–4 and of Comparison Examples A–C are passed over a three roll mill in the following formulation:

100 g resin solids
18 g aluminum silicate pigment
2 g carbon black
2 g lead silicate pigment The pigment pastes, milled to a standardized degree of fineness, are neutralized with diluted formic acid with the quantities listed in Table 1 and are slowly diluted with water while stirring to give paint baths of 15 percent solids.

Cathodically wired steel panels are immersed into the paint batch and are coated with a direct current, according to the conditions set forth in Table 1, while the tank materials are slowly stirred. The wall of the metallic paint container was wired as the anode. Deposition time was 60 seconds, bath temperature 22° C. The panels were removed from the paint bath, rinsed with tap water, and cured at 180° C. for 30 minutes.

Table 2 shows the evaluation results of the obtained coatings.

As apparent from an evaluation of the data of Tables 1 and 2, the heat-hardenable coating compositions of the present invention, in comparison with Examples A, B, and C falling outside the scope of the present invention, are superior in respect to electrochemical characteristics; appearance and characteristics of the coating upon application; and, furthermore, have improved throwing power and other physical characteristics. This superiority was not predictable.

In the above illustrative examples, various modifications can be made. Such modifications being within the ability of one skilled in the art are within the scope of the present invention and appended claims.

TABLE 1

| Examples | mol HCOOH per 100 g | pH-Value Paint Bath | Conductivity $\mu S \cdot cm^{-1}$ | Max. Voltage (V) On Zinc Phosphated Steel | Dry Film Thickness ($\mu m$) | Appearance Of The Coating |
|---|---|---|---|---|---|---|
| 1 | 0.06 | 5.05 | 805 | 220 V | 24$\mu$ | uniform, smooth, hard |
| 2 | 0.045 | 4.9 | 930 | 220 V | 35$\mu$ | uniform, smooth, hard |
| 3 | 0.06 | 4.5 | 1880 | 160 V | 18$\mu$ | uniform, hard, slight orange peel |
| 4 | 0.06 | 4.6 | 1650 | 180 V | 20$\mu$ | uniform, smooth, hard |
| A | 0.06 | 6.2 | 1220 | 140 V | 17$\mu$ | tears on vertical surfaces, poor edge covering, thermoplastic |
| B | 0.06 | 5.4 | 1310 | 120 V | 18$\mu$ | tears, some craters, poor edge covering |
| C | 0.06 | 4.5 | 1580 | 100 V | >50$\mu$ | foamy porous coating with poor adhesion |

TABLE 2

| Example | Throwing Power (1) | Flexibility (2) | Salt Spray Resistance (3) |
|---|---|---|---|
| 1 | 15.5 | 4.1 | 390 |
| 2 | 16.3 | 3.8 | 457 |
| 3 | 15.6 | 3.4 | 410 |
| 4 | 17.8 | 4.2 | 624 |
| A | 14.7 | 3.9 | 360 |
| B | 14.2 | 3.6 | 336 |
| C | 10.6 | not recordable owing to porous structure | 120 |

(1) A steel strip 1.4 cm wide, 30 cm long and 0.3 mm thick is inserted in diagonal position into a steel square with 1 cm² of interior aperture and a length of 30 cm. This testing device, wired as the cathode, is placed in vertical position into a plastic cylinder of 6 cm diameter and 40 cm height, the bottom of which contains a steel disc as the anode. The distance between the electrodes is 10 cm. The cylinder is filled with the paint material. Deposition time is 3 minutes. The length (in cm) of the coating on the steel strip recordable by visual inspection is a measure for the throwing power.
(2) Erichsen indentation (mm) DIN 53 156.
(3) ASTM B 117-64: Number of hours, after which 2 mm of rust appear at both sides of the incision line.

It is claimed:

1. Aqueous composition suitable for cathodic deposition in an electrodeposition system comprising the neutralized product of the reaction product of an unsaturated diene polymer carrying at least one 1,2-epoxy group per molecule, an amine compound containing amine functionality reactive with an epoxy group, and an alpha,beta-ethylenically unsaturated monomer free from epoxy reactive groups; the homopolymers of said monomer having a glass transition temperature of above about 320° K.

2. The aqueous coating composition of claim 1 wherein the diene polymer has an iodine number of between about 300 and 470, and an oxirane oxygen content of 1 to 12 percent.

3. The aqueous coating composition of claim 2 wherein said reaction product contains moieties of esterified monocarboxylic acids.

4. The aqueous coating composition of claim 1 wherein the diene polymer is a polymer of a monomer selected from the group consisting of butadiene, pentadiene, and isoprene, and has a molecular weight below 5000.

5. The aqueous coating composition of claim 1 wherein the amine compound is an aliphatic amine.

6. The aqueous coating composition of claim 1 wherein the amine compound is an alkanolamine.

7. The aqueous coating composition of claim 1 wherein the amine compound is a polyamine and the primary and secondary amine functionality reactive with oxirane groups is not substantially more than 2.

8. The aqueous coating composition of claim 7 wherein the polyamine includes tertiary amine groups.

9. The aqueous coating composition of claim 1 wherein said monomer is a member of the group consisting of (meth)acrylnitrile, methylmethacrylate, isopropylmethacrylate, tert.butylmethacrylate, styrene, vinyltoluol, indene, and vinylcarbazol, and mixtures thereof.

10. The process for producing heat-hardenable synthetic resins comprising reacting at a temperature of from about 80° to 220° C. an alpha,beta-ethylenically unsaturated monomer free from epoxy reactive groups, the homopolymers of said monomer having a glass transition temperature of above about 320° K.; a diene polymer containing at least one 1,2-epoxy group and an amine compound containing amine functionality reactive with an epoxy group, said amine functionality reactive with an epoxy group being not substantially more than two and said reaction product containing basic functionality neutralizable with an inorganic or organic acid to provide an aqueous solution of said resin, and thereafter forming an aqueous solution of said heat-hardenable synthetic resin by neutralizing said resin with an inorganic or organic acid.

* * * * *